(12) United States Patent
Rye (10) Patent No.: US 12,506,591 B2
(45) Date of Patent: Dec. 23, 2025

(54) SYSTEMS AND METHODS FOR ENABLING PARALLELIZED VERIFICATION OF FORENSIC COPIES USING NON-PARALLELIZABLE ALGORITHMS

(71) Applicant: OPEN TEXT INC., Menlo Park, CA (US)

(72) Inventor: Charles Roy Rye, Waukesha, WI (US)

(73) Assignee: OPEN TEXT INC., Menlo Park, CA (US)

( * ) Notice: Subject to any disclaimer, the term of this patent is extended or adjusted under 35 U.S.C. 154(b) by 141 days.

(21) Appl. No.: 18/490,288

(22) Filed: Oct. 19, 2023

(65) Prior Publication Data
US 2025/0132895 A1 Apr. 24, 2025

(51) Int. Cl.
*H04L 9/06* (2006.01)
*H04L 9/00* (2022.01)

(52) U.S. Cl.
CPC .............. *H04L 9/0643* (2013.01); *H04L 9/50* (2022.05)

(58) Field of Classification Search
None
See application file for complete search history.

(56) References Cited

U.S. PATENT DOCUMENTS

| | | | | |
|---|---|---|---|---|
| 9,021,266 B2* | 4/2015 | Kim | ...................... | H04L 9/3247 713/176 |
| 9,237,100 B1* | 1/2016 | Mizrahi | ................ | H04L 47/125 |
| 11,436,344 B1* | 9/2022 | Juch | ....................... | G06F 16/215 |
| 11,640,372 B2* | 5/2023 | Cote | ..................... | G06F 16/188 707/756 |
| 11,841,768 B2* | 12/2023 | Heckel | ................ | G06F 11/1461 |
| 2002/0191792 A1* | 12/2002 | Anand | .................. | H04L 9/0643 380/255 |
| 2007/0245119 A1* | 10/2007 | Hoppe | ................ | H04L 45/7453 707/E17.025 |
| 2013/0138966 A1* | 5/2013 | Tagashira | .............. | H04L 9/3242 713/179 |
| 2014/0250067 A1* | 9/2014 | Calkowski | ............ | G06F 16/178 707/624 |
| 2016/0350301 A1* | 12/2016 | Tripathy | ............... | G06F 3/0608 |
| 2021/0064733 A1* | 3/2021 | Stolbikov | ............... | G06F 21/44 |

* cited by examiner

*Primary Examiner* — Kaveh Abrishamkar
(74) *Attorney, Agent, or Firm* — Sprinkle IP Law Group (57) ABSTRACT

Systems, methods and products for enabling parallelized verification of a forensic copy generated using a non-parallelizable hashing algorithm. Disclosed embodiments generate the forensic copy of a data source using a non-parallelizable algorithm. In addition to generating a hash of the source data, intermediate hash states are stored for successive blocks of data from the data source. During verification of the forensic copy, the intermediate hash states and identifiers of the data blocks are retrieved from a data structure that is saved with the forensic copy. The non-parallelizable algorithm is used to hash each data block using the intermediate hash state preceding the data block as a starting hash state, then the hash of the data block is compared to the intermediate hash state following the data block to verify the data block. If all data blocks are successfully verified, the forensic copy is verified, otherwise verification fails.

20 Claims, 6 Drawing Sheets

SYSTEMS AND METHODS FOR ENABLING PARALLELIZED VERIFICATION OF FORENSIC COPIES USING NON-PARALLELIZABLE ALGORITHMS

TECHNICAL FIELD

The invention relates generally to generating a forensic copy of a target data source, and more particularly to systems and methods for generating and using information that enables parallelized validation of the forensic copy where generation of the forensic copy is dependent upon a non-parallelizable hash algorithm.

BACKGROUND

In many investigations and legal matters, it is necessary to be able to copy data sources and to verify that the copies of the data sources, once created, have not been tampered with. For instance, if a person is alleged to have committed a wrongful act that involves a computer, it is important to be able to obtain a copy of the data that is stored on the computer, and to be able to verify that the copy accurately duplicates the data on the computer. Likewise, it may be desirable to make verifiable copies of any other data source (e.g., servers, smart phones, tablet computers, personal information devices or any other device that stores digital data).

Commonly, a forensic copy of a data source is created by retrieving source data from the data source, hashing the stream of data from the data source, and storing the stream of data as the forensic copy. The final hash (the value created by hashing the stream of data from the data source) is also stored with the forensic copy. The final hash can then be used to verify that the forensic copy is identical to the original source data by hashing the forensic copy and verifying that the resulting hash is identical to the final hash of the original source data. If the hashes match, the forensic copy is identical to the original source data. If the hashes do not match, the forensic copy is not identical to the original source data, indicating that the forensic copy may have been corrupted or tampered with.

In many cases, it is necessary to use specific hashing algorithms to create the forensic copy. For instance, when a forensic copy is made for use in a legal proceeding, it is necessary to use a hashing algorithm that is trusted by the court that is handling the proceeding.

Typically, courts prefer technologies that have a long history of established use, rather than more recent technologies. In the case of hashing algorithms, most courts require that a hashing algorithm such as MD5, SHA1, or SHA256 must be used to verify forensic copies of data sources.

One of the problems with a SHA 256 algorithm is that it is non-parallelizable. In other words, in order to create the final hash, the algorithm must be performed by a single process on a single stream of data from the data source. The algorithm data cannot be broken into multiple processes that can be performed in parallel. The same is true when verifying the forensic copy. In order to verify that the hash of the forensic copy matches the hash of the original source data, the hashing algorithm must be performed by a single process on a single stream of data from the forensic copy to produce the final hash that is compared to the hash of the original source data. Because the verification of the forensic copy is non-parallelizable, it can take a very long time to perform the verification.

SUMMARY

The embodiments disclosed herein address the problem of the large amount of time that is required to verify a forensic copy that is created using a non-parallelizable hashing algorithm. These embodiments generate the forensic copy of the data source in a manner that is similar to conventional methods in that they use non-parallelizable algorithms to generate the hash of the source data, but rather than only generating a final value that is a hash of the source data, the present embodiments store intermediate hash states that are generated as successive blocks of data from the data source are hashed. The intermediate hash states are stored in a table or other data structure that is saved with the forensic copy and the final hash of the source data.

Then, when it is desired to verify the forensic copy, the intermediate hash states can be used to verify individual blocks of the forensic copy. If verification of all of the blocks using the intermediate hash states is successful, then the entire forensic copy is verified. If verification of any one of the blocks using the intermediate hash states fails, then verification of the forensic copy as a whole fails.

The ability to verify each of the blocks individually is advantageous because the verification of any one block can be performed independently of any of the other blocks. Consequently, multiple blocks can be verified at the same time. In other words, the verification of the blocks can be parallelized, with different blocks being verified by different processors (or different cores of a multi-core processor). The parallel verification of multiple blocks enables faster verification of the forensic copy.

One embodiment comprises a method for generating data for parallel verification of a forensic copy using a non-parallelizable algorithm. The method begins with receiving an input data stream from a first data source. Using an initial hash value, the input data stream is hashed with the non-parallelizable hash algorithm. At one or more intermediate points in the input data stream, information is stored, including an offset or other identifier of the location of the intermediate point in the input data stream, and a corresponding intermediate hash state. Outputs are provided, including a forensic copy of the input data stream, a final hash value generated by the non-parallelizable hash algorithm, and the stored offsets and corresponding intermediate hash values corresponding to each of the intermediate points in the input data stream.

In some embodiments, the method includes verifying the forensic copy of the input data stream against the final hash value. Verifying the forensic copy may comprise hashing the forensic copy of the input data stream with the non-parallelizable hash algorithm using the initial hash value to generate a verification hash value and comparing the verification hash value to the final hash value, where if the verification hash value matches the final hash value the verifying is successful, and otherwise the verifying failed. Alternatively, verifying the forensic copy may comprise separately verifying two or more data blocks in the forensic copy of the input data stream which are separated at the offsets corresponding to the intermediate points. Separately verifying the two or more data blocks may comprise, for each of the two or more data blocks, identifying a starting offset of the data block, identifying a hash value immediately preceding the data block, identifying a hash value immediately following the data block, and hashing, using the immediately preceding hash value, the forensic copy of the input data stream with the non-parallelizable hash algorithm to generate a corresponding verification hash value and comparing the corresponding verification hash value to the immediately following hash value. If the corresponding verification hash value matches the immediately following hash value the verifying of the data block is successful, and otherwise the verifying of the data block failed. If verification of all of the two or more data blocks is successful, verification of the forensic copy of the input data stream is successful, and otherwise verification of the forensic copy of the input data stream failed.

In some embodiments, receiving the input data stream from the first data source comprises reading the input data stream from a device connected to an input port of a forensic storage and verification device. In some embodiments, providing the outputs comprises storing the forensic copy of the input data stream, the final hash value and the offsets and corresponding intermediate hash states on a data storage device connected to an output port of the forensic storage and verification device.

The forensic copy of the input data stream and the final hash value may be contained in a standardized forensic data format, and the offsets and corresponding intermediate hash states are stored in a data structure having a corresponding record for each of a plurality of data blocks in the forensic copy of the input data stream, the records enabling identification of a location of each data block in the forensic copy of the input data stream and identification of starting and ending hash values associated with each data block.

Storing the offsets and corresponding intermediate hash states may comprise storing the offsets and corresponding intermediate hash states in a data structure comprising a plurality of records, each record containing at least one of the offsets and a corresponding resulting intermediate hash state generated following hashing of the corresponding data block identified by the one of the offsets. Each record in the data structure may include exactly one offset and exactly one hash value, wherein a data block corresponding to the record is identified by the offset contained in the record and a location which either: is an offset identified in a previous record; or is a starting location of the forensic copy of the input data stream. Each record in the data structure may include a starting offset and an ending offset for a corresponding data block. Each record in the data structure may include a starting hash value and an ending hash value for a corresponding data block.

An alternative embodiment comprises a method for verifying the forensic copy of the input data stream by separately verifying two or more data blocks in the forensic copy of the input data stream which are separated at the offsets corresponding to the intermediate points. Separately verifying the data blocks may comprise, for each of the data blocks, identifying a starting offset of the data block, identifying a hash value immediately preceding the data block, identifying a hash value immediately following the data block, and hashing, using the immediately preceding hash value, the forensic copy of the input data stream with the non-parallelizable hash algorithm to generate a corresponding verification hash value and comparing the corresponding verification hash value to the immediately following hash value. If the corresponding verification hash value matches the immediately following hash value the verifying of the data block is successful, and otherwise the verifying of the data block failed. If verification of all of the two or more data blocks is successful, verification of the forensic copy of the input data stream is successful, and otherwise verification of the forensic copy of the input data stream failed.

An alternative embodiment may comprise a device for generating a forensic copy of a data source and associated information which enables the parallelized verification of the forensic copy. The system may comprise one or more processors, one or more memories, at least one input port adapted to be connected to a target device and at least one output port adapted to be connected to an output data storage device. The processors are adapted to receive an input data stream from the target device, hash the input data stream with a non-parallelizable hash algorithm, at one or more intermediate points in the input data stream store a corresponding offset identifying the location of the intermediate point in the input data stream and a corresponding intermediate hash state. The processors are further adapted to providing as outputs a forensic copy of the input data stream, a final hash value generated by the non-parallelizable hash algorithm, and the stored offsets and corresponding intermediate hash states corresponding to each of the intermediate points in the input data stream.

In some embodiments, the processors are further adapted to verify the forensic copy of the input data stream against the final hash value. The forensic copy may be verified by separately verifying two or more data blocks in the forensic copy of the input data stream which are located at the offsets corresponding to the intermediate points. Separately verifying the data blocks may comprise, for each of the two or more data blocks, identifying a starting offset of the data block, identifying a hash value immediately preceding the data block, identifying a hash value immediately following the data block, and hashing, using the immediately preceding hash value, the forensic copy of the input data stream with the non-parallelizable hash algorithm to generate a corresponding verification hash value and comparing the corresponding verification hash value to the immediately following hash value. If the corresponding verification hash value matches the immediately following hash value the verifying of the data block is successful, and otherwise the verifying of the data block failed. If verification of all of the two or more data blocks is successful, verification of the forensic copy of the input data stream is successful, and otherwise verification of the forensic copy of the input data stream failed.

In some embodiments, the forensic copy of the input data stream and the final hash value are contained in a standardized forensic data format, and the offsets and corresponding intermediate hash states are stored in a data structure having a corresponding record for each of a plurality of data blocks in the forensic copy of the input data stream, where the records enable identification of a location of each data block in the forensic copy of the input data stream and identification of starting and ending hash values associated with each data block. In some embodiments, the offsets and corresponding intermediate hash states are stored in a data structure comprising a plurality of records, each record containing at least one of the offsets and a corresponding resulting intermediate hash state generated following hashing of the corresponding data block identified by the one of the offsets.

An alternative embodiment may comprise a device for verifying a forensic copy of a data source using associated intermediate hash state information. The system may comprise one or more processors, one or more memories, and at least one port adapted to be connected to a data storage device containing a forensic copy of the input data stream, a final hash value generated by a non-parallelizable hash algorithm, and stored offsets and corresponding intermediate hash states corresponding to each of the intermediate points in the forensic copy. The processors are adapted to verify the forensic copy by separately verifying two or more data blocks in the forensic copy which are located at the offsets corresponding to the intermediate points. Separately verifying the data blocks may comprise, for each of the two or more data blocks, identifying a starting offset of the data block, identifying a hash value immediately preceding the data block, identifying a hash value immediately following the data block, and hashing, using the immediately preceding hash value, the forensic copy of the input data stream with the non-parallelizable hash algorithm to generate a corresponding verification hash value and comparing the corresponding verification hash value to the immediately following hash value. If the corresponding verification hash value matches the immediately following hash value the device passes the verification of the data block, and otherwise fails the verification. If verification of all of the two or more data blocks is successful, the device passes verification of the forensic copy, and otherwise fails verification of the forensic copy.

Another alternative embodiment is a computer program product comprising a non-transitory computer-readable medium storing instructions executable by one or more processors to perform a method as described above. This method may include receiving an input data stream from a first data source, using an initial hash value, hashing the input data stream with a non-parallelizable hash algorithm, and at one or more intermediate points in the input data stream storing a corresponding offset identifying the location of the intermediate point in the input data stream and storing a corresponding intermediate hash state. The method may also include providing as outputs a forensic copy of the input data stream, a final hash value generated by the non-parallelizable hash algorithm, and the stored offsets and corresponding intermediate hash states corresponding to each of the intermediate points in the input data stream.

In some embodiments, the instructions are further executable by the one or more processors to verify the forensic copy of the input data stream against the final hash value by separately verifying two or more data blocks in the forensic copy of the input data stream which are separated at the offsets corresponding to the intermediate points. Separately verifying the data blocks may comprise, for each of the data blocks, identifying a starting offset of the data block, identifying a hash value immediately preceding the data block, identifying a hash value immediately following the data block, and hashing, using the immediately preceding hash value, the forensic copy of the input data stream with the non-parallelizable hash algorithm to generate a corresponding verification hash value and comparing the corresponding verification hash value to the immediately following hash value. If the corresponding verification hash value matches the immediately following hash value the verifying of the data block is successful, and otherwise the verifying of the data block failed. If verification of all of the two or more data blocks is successful, verification of the forensic copy of the input data stream is successful, and otherwise verification of the forensic copy of the input data stream failed.

Numerous alternative embodiments may also be possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions, or rearrangements may be made within the scope of the disclosure without departing from the spirit thereof, and the disclosure includes all such substitutions, modifications, additions, or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features.

DETAILED DESCRIPTION

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the embodiments in detail. It should be understood, however, that the detailed description and the specific examples are given by way of illustration only and not by way of limitation. Various substitutions, modifications, additions and/or rearrangements within the spirit and/or scope of the underlying inventive concept will become apparent to those skilled in the art from this disclosure.

The embodiments disclosed herein receive a stream of data from a data source and hash the stream of data with a non-parallelizable hashing algorithm to create a verifiable forensic copy of the data source, as well as a hash of the source data and a set of data that identifies blocks of the data and intermediate hash states that can be used to verify individual ones of the blocks of data. If all of the blocks are individually verified, the entire forensic copy is verified. Because the blocks of data can be verified individually and independently, they can be verified in parallel, reducing the time required to verify the forensic copy.

Figure 1:
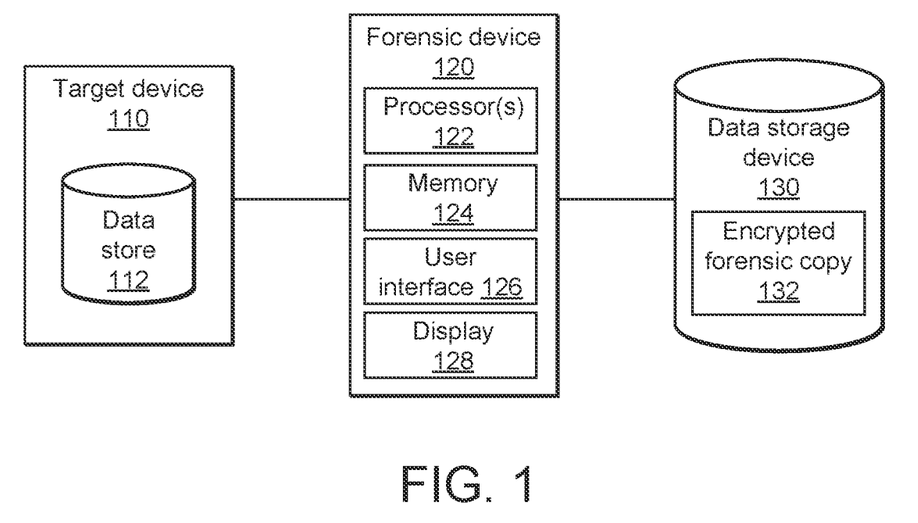
FIG. 1 is a diagram illustrating a system for generating a forensic copy of a data source in accordance with some embodiments.

Referring to FIG. 1, a diagram is shown to illustrate a system for generating a forensic copy of a data source in accordance with some embodiments. As depicted in this figure, a device 120 (which may be referred to as a forensic imager) is coupled between a target device 110 and a data storage device 130. Target device 110 may be any device that contains data that is involved in an investigation, legal proceeding, or similar matter. The data is stored in a data store 112 which may be, for example, RAM, ROM, flash memory, a hard disk drive, a solid-state drive, an optical storage medium, or other computer readable memory or combination thereof. The data may be stored in any format capable of being stored in the data store.

Because it may not be practical to prevent any further use of the target device, it may be necessary to make a forensic copy of the data stored by the device. A "forensic copy," as used herein, refers to a copy of the data that can be verified to be identical to the data stored by the device at the time the copy is made.

Forensic imager 120 includes a processor 122, a memory 124, and a user interface module 126 and a display 128. Forensic imager 120 may also include one or more input ports (not explicitly shown in the figure) which enable the forensic device to be coupled to corresponding target devices (e.g., 110), as well as one or more output ports (not explicitly shown in the figure) which enable the forensic device to be coupled to corresponding output devices (e.g., 130).

Processor 122 is configured to execute user interface module 126 to display a user interface on display 128. The interface allows a user to interact with and operate forensic imager 120. The available operations include, in some embodiments, a forensic copy function which copies data from a target device (e.g., from data store 112 in target device 110) to an output storage device (e.g., data storage device 130), generates a hash of the data from the target device, and stores the hash of the data on the output storage device with the forensic copy. In some embodiments, the forensic copy of the data and the hash of the data are stored in a file 132 on the data storage device. Embodiments may also include functions to, for example, validating or verifying a forensic copy, either conventionally or using the parallelized methods described herein.

Conventionally, a device for generating a forensic copy of a data source would generate a single value which is the hash of the data stored on the target device. This value would be stored in the file on the output data storage device, along with the forensic copy of the data. In the disclosed embodiments, the forensic copy of the data and the value corresponding to the hash of the data are again stored in the file 132 on output data storage device 130, but file 132 also includes values corresponding to intermediate hash states of the copied target data, as well as values identifying individual blocks of the target data. This information may be stored in a table or any other suitable data structure which is included in file 132 on output data storage device 130. The intermediate hash state information may alternatively be stored separately from the file containing the forensic copy and corresponding final hash.

Figure 2:
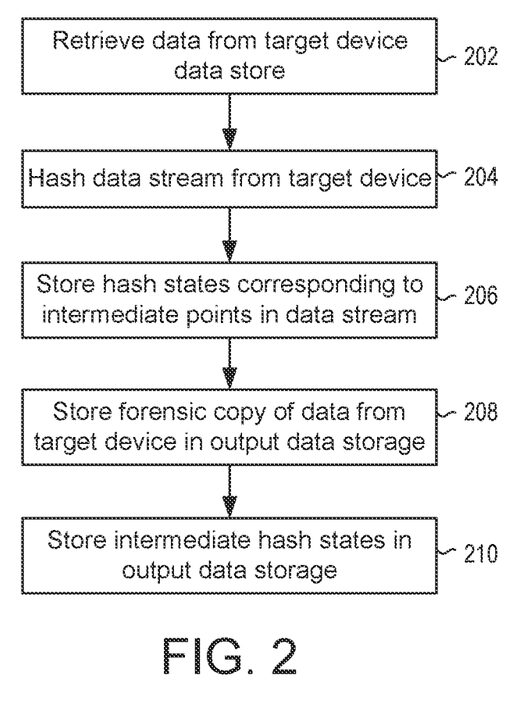
FIG. 2 is a flow diagram illustrating a method for generating information for quickly verifying a forensic copy of a data source in accordance with some embodiments.

Referring to FIG. 2, a diagram is shown to illustrate a method for generating information for quickly verifying a forensic copy of a data source in accordance with some embodiments. At step 202, a forensic imager retrieves data from the data store of a target device. The data may be retrieved as a stream which is processed as it is received by the forensic imager. At step 204, the forensic imager hashes the stream of data that is received from the target device. The hashing process begins with a defined initial hash state and continuously hashes the stream data as it is received, continuing until all of the data has been received from the target device. At periodic regular or irregular intervals during the hashing process, the forensic imager records intermediate hash states and the locations in the data stream corresponding to these intermediate hash states (step 206).

At step 208, a forensic copy of the data received from the target device is stored in an output data storage device. The storage of the forensic copy is a process that continues as the stream of data is received from the target device and processed by the forensic imager. Thus, as the target data stream is received, the forensic imager concurrently performs the processes of hashing the received data, periodically storing intermediate hash states and corresponding locations, and storing the data in a forensic copy on the output data storage device.

At step 210, the entire forensic copy has been stored on the output data storage device, and the forensic imager has completed the hashing of the entire corpus of source data on the target device. The final hash of the source data is also stored on the output data storage device. Further, at step 212, the intermediate hash states which have been recorded by the forensic imager are stored on the output data storage device, along with the corresponding locations in the forensic copy of the data. The intermediate hash states and locations may be stored in a temporary data structure maintained by the forensic imager which is then copied to the output data device at the end of the process, or the intermediate hash states and locations may be stored in a data structure on the output data storage device as they are determined, eliminating the temporary storage of this information on the forensic imager.

Figure 3A:
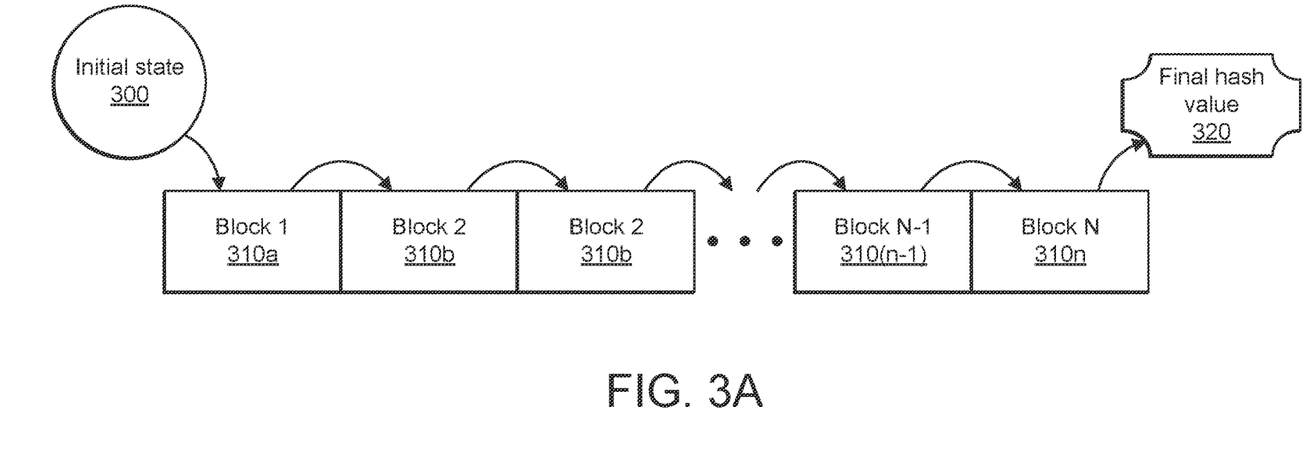
FIG. 3A is a diagram illustrating conventional processing for generating a hash for a corpus of source data.
Figure 3B:
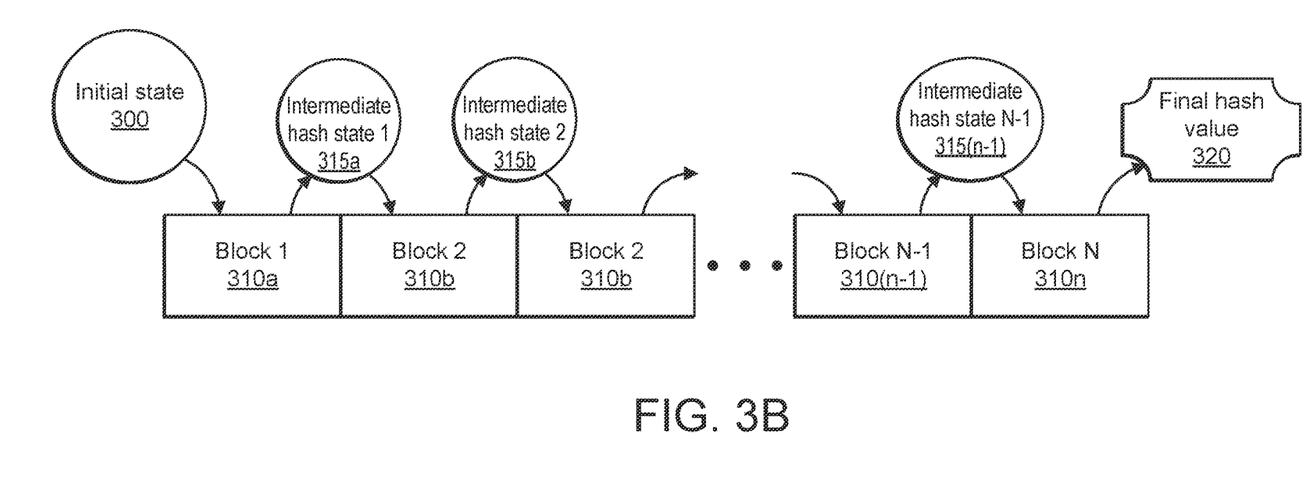
FIG. 3B is a diagram illustrating a method for generating intermediate hash states in addition to a final hash of source data in accordance with some embodiments.

Referring to FIGS. 3A and 3B, a pair of diagrams is shown to illustrate the generation of intermediate hash states in some embodiments in comparison to conventional hashing. FIG. 3A depicts the conventional processing of generating a hash for a corpus of source data, while FIG. 3B depicts a method for generating intermediate hash states in addition to the final hash of the source data.

Referring to FIG. 3A, the process of hashing the source data is illustrated. As depicted here, the source data is received by the forensic imager as a stream which may be viewed as a series of data blocks 310a-310n (where block 310a is the first block received by the forensic imager, and block 310n is the last block received by the device). When the forensic imager receives first block 310a, it begins processing the block using the particular hashing algorithm employed by the device. The forensic imager continues to receive data from the data source and processes each successive block as part of the whole of the corpus of source data. The process of generating the hash for the source data is therefore a substantially continuous process that begins with a predetermined initial hash state 300 and ends with a final value 320 which is a hash of the entire corpus of source data.

It should be noted that different instances of the same or similar devices may be identified herein by a common reference number followed by a letter. For instance, as depicted in FIG. 3A, this system includes data blocks 310a-310n. The individual data blocks may be referred to by the number and letter, or the blocks may be referred to generically or collectively by the number alone (e.g., blocks 310).

As noted above, the hashing algorithm is non-parallelizable. For the purposes of this disclosure, "non-parallelizable" refers to an algorithm for which the process of hashing the source data cannot be broken into processes that can be performed in parallel. A particular block of the source data cannot be processed by the hashing algorithm until the previous block has been processed by the algorithm because the processing of the block is dependent upon an initial hash state which is determined based on the hashing of the preceding block. This is indicated by the arrows in the figure, which show that the initial, predetermined hash state 300 is used to hash Block 310*a*, then the hash state resulting from Block 310*a* is used as the initial hash state for hashing block 310*b*, and so on. Ultimately, the hash state resulting from the hashing of Block 310*n*-1 is used as the initial hash state for hashing block 310*n*, and the hash state resulting from the hashing of block 310*n* is the final hash 320 of the entire corpus of source data.

It is important to note that, in this conventional process, the hash state which is generated as a result of hashing each data block and which is used as the initial hash state for the hashing of the following block is not persisted, published, displayed or made available for any purpose outside of the hashing algorithm. Consequently, when it is desired to verify the forensic copy of the source data, it is necessary to perform this process again, but on the forensic copy rather than the source data. This procedure is performed in exactly the same way the original data source was hashed. The forensic copy is hashed to generate a value that can be compared to the final hash 320 of the original source data. If the values match, the forensic copy is verified, and otherwise it is not. It should be noted that, although the generation and storage of intermediate hash state information in the disclosed embodiments enables the parallel verification of individual blocks of the forensic copy, the term "non-parallelizable" will nevertheless be used to describe the algorithm for the purpose of consistency.

As noted above, the problem with this process is that the verification of the forensic copy requires that the hashing process be performed serially on the data of the forensic copy, which can take a very long time. For forensic copies of large amounts of data, the process may take hours. The embodiments disclosed herein can substantially reduce the amount of time required to verify a forensic copy by enabling the verification of individual blocks data in parallel. The parallel verification of individual blocks can be easily performed in a multicore processor in a forensic imager, which can separately perform concurrent verification of multiple blocks of the forensic copy.

Referring to FIG. 3B, a diagram illustrates the process of hashing the source data using the disclosed embodiments. As depicted in this figure, the source data is received by the forensic imager as a stream (a series of data blocks 310*a*-310*n*). The same non-parallelizable hashing algorithm that is used in FIG. 3A's example of the conventional process can be used in the example of FIG. 3B. The difference is that, after each data block is hashed, the resulting intermediate hash state 315 is saved, along with information identifying the extent of the data block. For instance, after block 310*a* is hashed, the resulting intermediate hash state 315*a* is saved with information indicating the beginning and end of block 310*a*. The hash state resulting from the hashing of block 310*n* is the same as final hash state 320.

Figure 4:
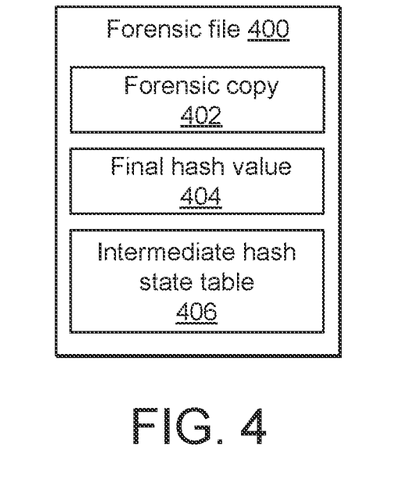
FIG. 4 is a diagram illustrating an example output file for a forensic copy of a data source in accordance with some embodiments.

Referring to FIG. 4, a diagram is shown to illustrate an example output file for a forensic copy of a data source in accordance with some embodiments. In this example, a file 400 for the forensic copy contains the actual forensic copy 402 of the source data, the final hash 404 of the source data, and a data structure 406 that contains the intermediate hash state information and the information identifying the extent of the corresponding blocks. Data structure 406 is not generated during conventional processes for generating forensic copies and is not included in conventional forensic copy files. As noted above, in alternative embodiments, data structure 406 may be stored separately from the file containing forensic copy 402 and final hash 404, although an association between the data structure and the forensic copy is maintained.

The intermediate hash state is a value, similar to (but not the same as) final hash 320. The information identifying the extent of the data block may be, for example, information identifying the location at which the data block is stored in the forensic copy, as well as a length of the data block. Alternatively, this information may comprise a starting location of the data block and an ending location of the block. As noted above, the intermediate hash states and corresponding location information may be temporarily stored in the forensic imager, with a final data structure including all of this information being stored on the output data storage device, or the information corresponding to each block may be saved in a data structure on the output data storage device as the information is generated.

Figure 5:
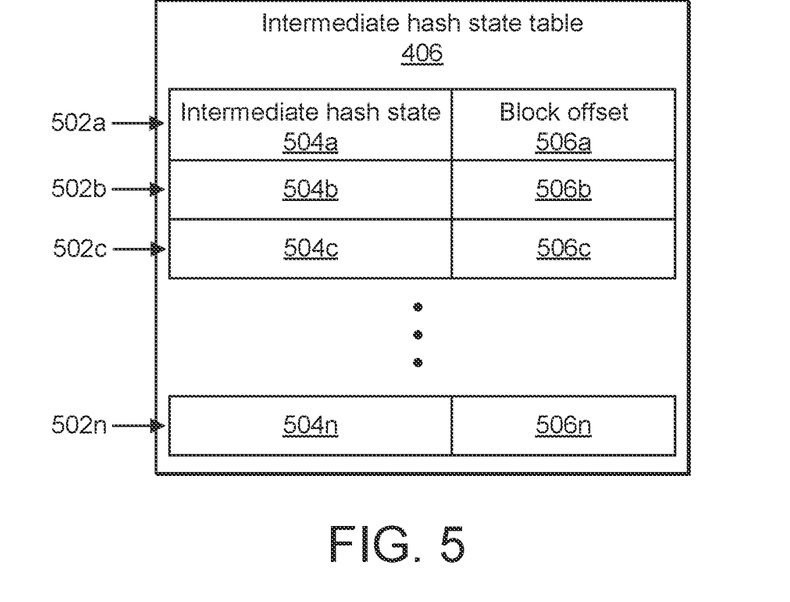
FIG. 5 is a diagram illustrating an example data structure to store intermediate hash states and block location and extent information in accordance with some embodiments.

Referring to FIG. 5, a diagram is shown to illustrate an example data structure to store the intermediate hash states and block location and extent information. In this example, the data structure is a simple table 500 that contains multiple entries 502*a*-502*n*. Each entry 502 includes a value 504 for the intermediate hash state for a data block and a value 506 for the location of the data block.

As will be described in more detail below, the information in the intermediate hash state data structure is used to verify individual data blocks within the forensic copy. In order to perform the verification, it is necessary to identify the data block and to identify both a starting hash state and an end hash state for the block. It may be possible in some embodiments to identify these four values-starting hash state, ending hash state, starting data block location and ending data block location—in the entry for each data block. The example of FIG. 5 uses only two values instead of four. This format takes advantage of the fact that the ending hash state for one data block is the starting hash state for the following data block, and the ending location for one data block is the starting location for the following data block. Thus, the table avoids the duplication of information that would occur if the table included the start and end of each data block (where the end of one data block and the beginning of the next block are redundant).

Referring again to FIG. 3B, when the forensic imager receives first block 310*a*, It begins processing the block using the particular hashing algorithm employed by the device. The forensic imager continues to receive data from the data source and processes each successive block as part of the whole of the corpus of source data. The process of generating the hash for the source data is therefore a substantially continuous process that begins with a predetermined initial hash state 300 and ends with a final value 320 which is a hash of the entire corpus of source data.

As noted above, the hashing algorithm is non-parallelizable—the process of hashing the source data cannot be broken into processes that can be performed in parallel. A particular block of the source data cannot be processed by the hashing algorithm until the previous block has been processed by the algorithm because the processing of the block is dependent upon an initial hash state which is determined based on the hashing of the preceding block. This is indicated by the arrows in FIG. 3B, which show that the initial, predetermined hash state 300 is used to hash block 310*a*, then the hash state resulting from block 310*a* is used as the initial hash state for hashing block 310*b*, and so on. Ultimately, the hash state resulting from the hashing of block 310*n*-1 is used as the initial hash state for hashing block 310*n*, and the hash state resulting from the hashing of block 310*n* is the final hash 320 of the entire corpus of source data.

Because the intermediate hash states for the blocks must be generated by processing the blocks serially in the order that they are received, the generation of this information takes essentially the same amount of time as the generation of the hash of the original source data using the conventional method. For example, if the generation of the hash using the conventional method takes several hours, the generation of the hash using the methods disclosed herein will likewise take several hours. After the forensic copy, final hash and intermediate hash state information is generated and stored on the output data storage device, however, the verification of the forensic copy maybe completed in much less time because the individual blocks of data in the forensic copy can be individually verified In parallel. If all of the blocks are verified, then the forensic copy as a whole is also verified, but if anyone of the blocks is not verified, then the verification of the forensic copy as a whole fails.

Figure 6:
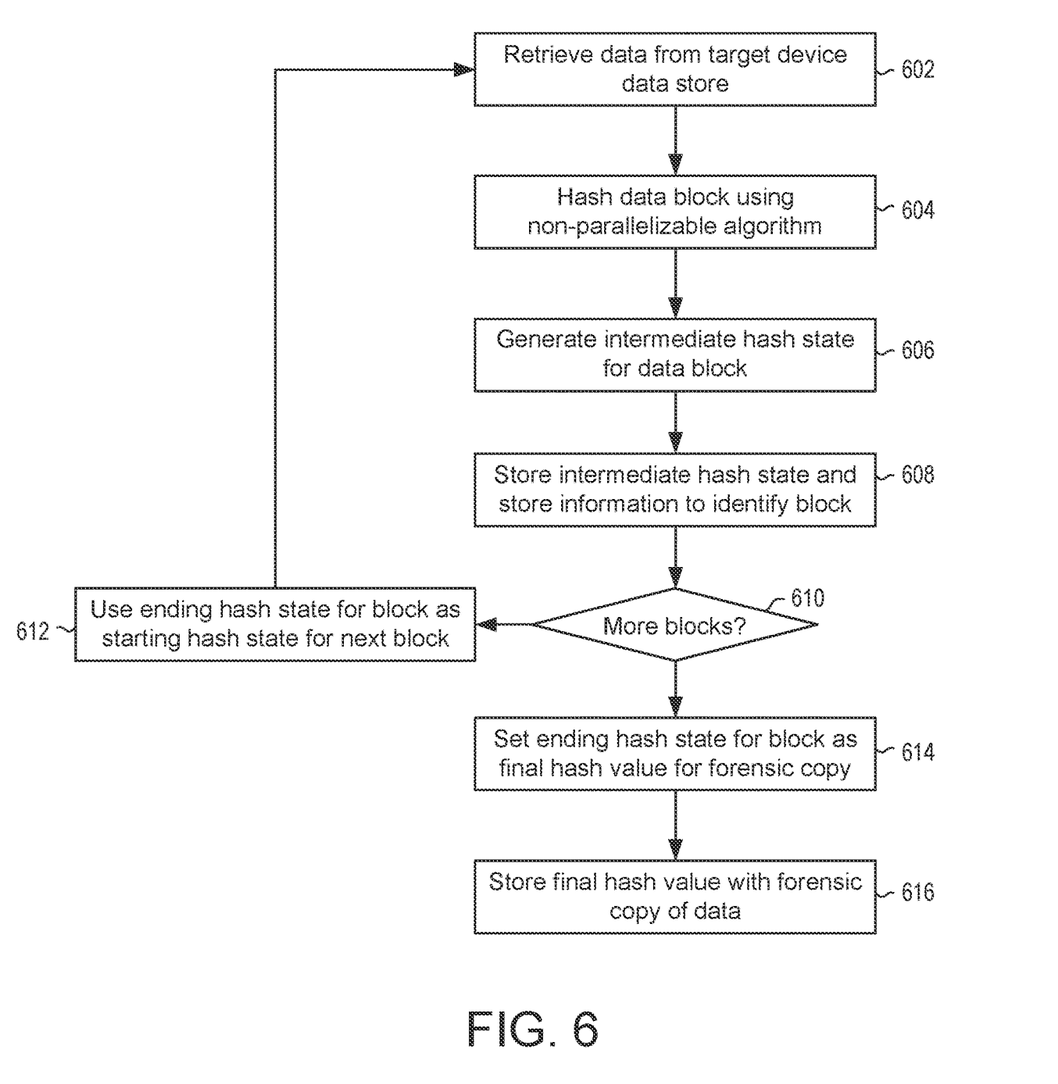
FIG. 6 is a flow diagram illustrating a method for generating a forensic copy and corresponding final and intermediate hash states in accordance with some embodiments.

Referring to FIG. 6, a flow diagram is shown to illustrate a method for generating a forensic copy and corresponding final and intermediate hash states in accordance with some embodiments. At step 602, a forensic imager retrieves a block of data from a data store on a target device. The data may be retrieved as a block, or the forensic imager may receive a stream of data. Further, if the data is received as a stream, the data may be processed as a stream, or it may be collected and processed as a block of data.

At step 604, the forensic imager hashes a block of data using a non-parallelizable hashing algorithm. At step 606, the forensic imager determines an intermediate hash state for a just-processed block of data. The point in the data stream at which the intermediate hash state may be determined may be predetermined (e.g., the forensic imager may determine the intermediate hash state after every N bytes of data), or the intermediate hash state may be determined at a point in the data stream which is dynamically determined (which may result in data blocks of varying sizes). At step 608, the forensic imager stores the identified intermediate hash state and the corresponding identification of the block. This information may be stored temporarily in the forensic imager, or it may be stored directly in the output data store.

After a first block portion of data is hashed and the resulting intermediate hash state information is stored, the forensic imager determines at step 610 whether there are additional blocks of data from the data source to be processed. If there are additional blocks of data, at step 612 The forensic imager uses the intermediate hash state resulting from the previous data block as the input hash state for a next data block. The forensic imager then returns to step 602 and retrieves the next block of data (or receives the next portion of the data stream) and repeats the process of hashing the new data (step 604), generating a new intermediate hash state (step 606) and storing the block on the output data storage device, as well as storing the intermediate hash state and corresponding location information (step 608).

If, at step 610, the forensic imager determines that there are no additional blocks of data from the data source to be processed, the device proceeds to step 614, at which the intermediate hash state for the last block is set as the final hash for the forensic copy as a whole. The final hash for the forensic copy is then stored on the output data storage device (step 616). If the intermediate hash state and block location information has not already been stored on the output data storage device (i.e., if this information was temporarily stored internal to the device), this information is stored on the output data storage device.

After the forensic copy, final hash and intermediate hash state information have been stored on the output data storage device, the forensic copy can be verified using the final hash, the intermediate hash state information, or both. Commonly, as soon as the forensic copy has been stored, it is verified. The forensic copy can, however, be verified at any time after it has been stored.

Verification of the forensic copy can be performed conventionally using the final hash of the original source data in the same way the original source data was hashed. In other words, the forensic copy is retrieved by the forensic imager and is processed using the same non-parallelizable algorithm that was used to generate the final hash of the original source data. This generates a hash value for the forensic copy. The final hash of the forensic copy is then compared to the final hash of the original source data. If the final hash of the forensic copy is the same as the final hash of the original source data, the forensic copy is verified as an identical copy of the original source data. If the final hash of the forensic copy is not the same as the final hash of the original source data, the forensic copy is not and identical copy of the original source data, which may indicate that the forensic copy has been corrupted, or that the forensic copy has been tampered with.

In addition to the conventional process of verifying the forensic copy, verification can be performed using the intermediate hash state information which is generated and stored in the disclosed embodiments. Because these embodiments enable the verification of the forensic copy via independent verification of individual blocks of the forensic copy, this process can be parallelized, which can substantially reduce the amount of time required for the verification. For example, if the verification process is performed by an eight-core processor, eight blocks can be concurrently verified, reducing the verification time by up to a factor of eight in comparison to the same eight-core processor performing conventional verification using only a single one of the cores.

Figure 7:
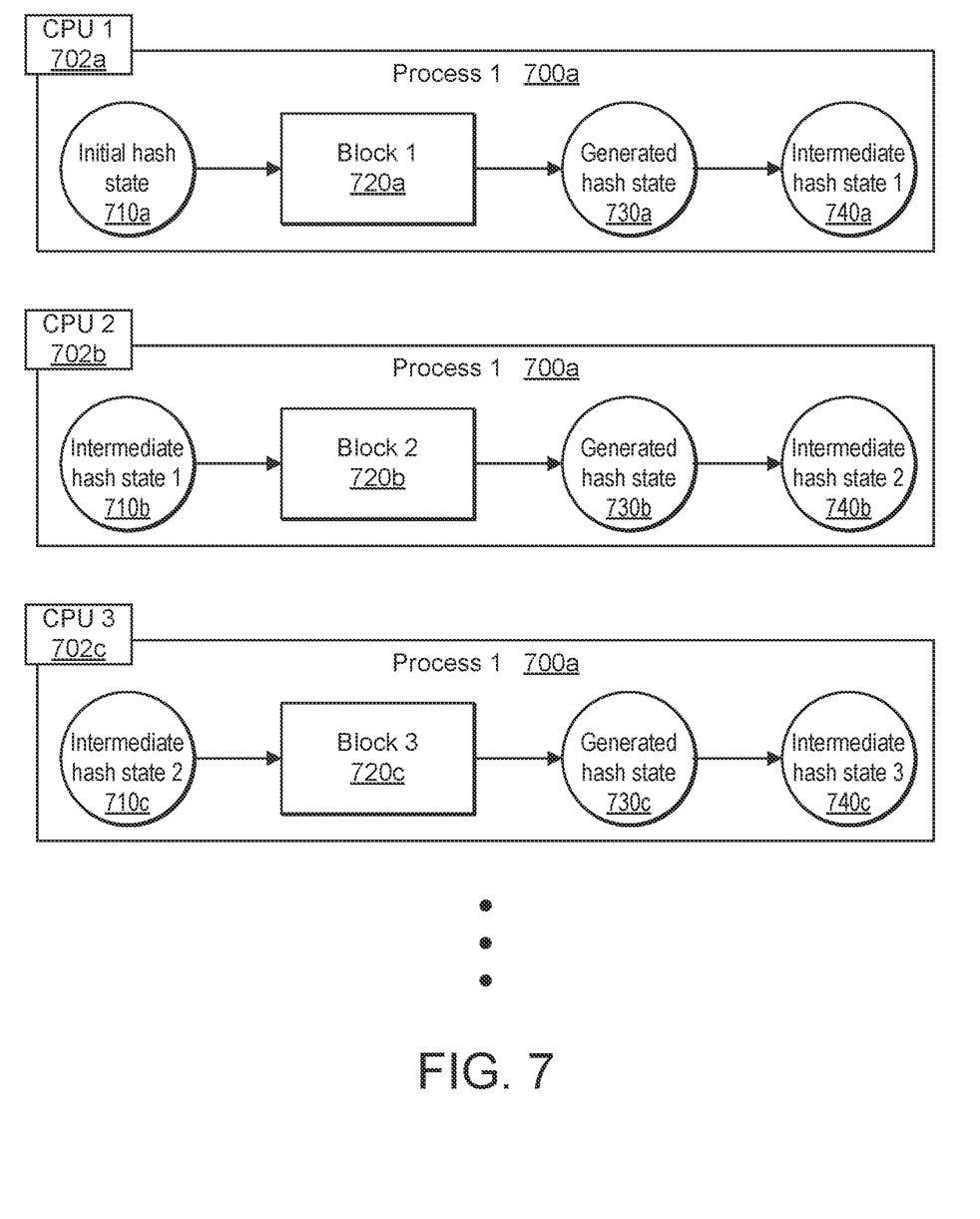
FIG. 7 is a diagram illustrating parallel verification of individual data blocks in accordance with some embodiments.

Referring to FIG. 7, a diagram is shown to illustrate the parallel verification of individual data blocks in accordance with some of the disclosed embodiments. In this figure, three individual processes 700*a*-700*c* are depicted. Each of these processes can be independently executed by a different processor 702. For instance, process 700*a* is executed by processor 702*a*, process 700*b* is executed by processor 702*b*, and so on. While only three processes are depicted in the figure, there may be more parallel processes, depending upon the number of available processors or cores. For example, if there are eight available processor cores, there may be up to eight parallel processes. If there are more than this number of data blocks to be verified, additional data blocks will be processed as verification of other data blocks is completed, and the corresponding processors become available to process additional data blocks.

It should be noted that, for purposes of clarity, the beginning hash state used in each process will be indicated by reference number 710, and the ending hash state that will be compared to the stored hash state following the block will be referred to by reference number 730. In process 1 (700*a*), beginning hash state 710*a* is the same as the initial hash state 300 in FIGS. 3A and 3B. Although not shown in FIG. 7, when the last data block is processed, the generated hash will be compared to the final hash value of the forensic copy, which is the same as hash value 320 in FIGS. 3A and 3B.

In each process in FIG. 7, a corresponding block 720 is identified using the location information stored in the intermediate hash state data structure, and the block is retrieved from the data storage device that stores the forensic copy. The beginning intermediate hash state 710 and the ending intermediate hash state 740 corresponding to the data block are retrieved from the intermediate hash state data structure. Process 700 then hashes data block 710 using beginning intermediate hash state 710. The hashing of data block 720 generates a hash state 730 of the data block. Hash state 730 is then compared to retrieved ending intermediate hash state 740 to determine whether they match. If generated hash state 730 and retrieved ending intermediate hash state 740 match, it is verified that data block 720 is identical to the corresponding block of the original source data. Otherwise, the data blocks are not identical, and the verification fails.

Figure 8:
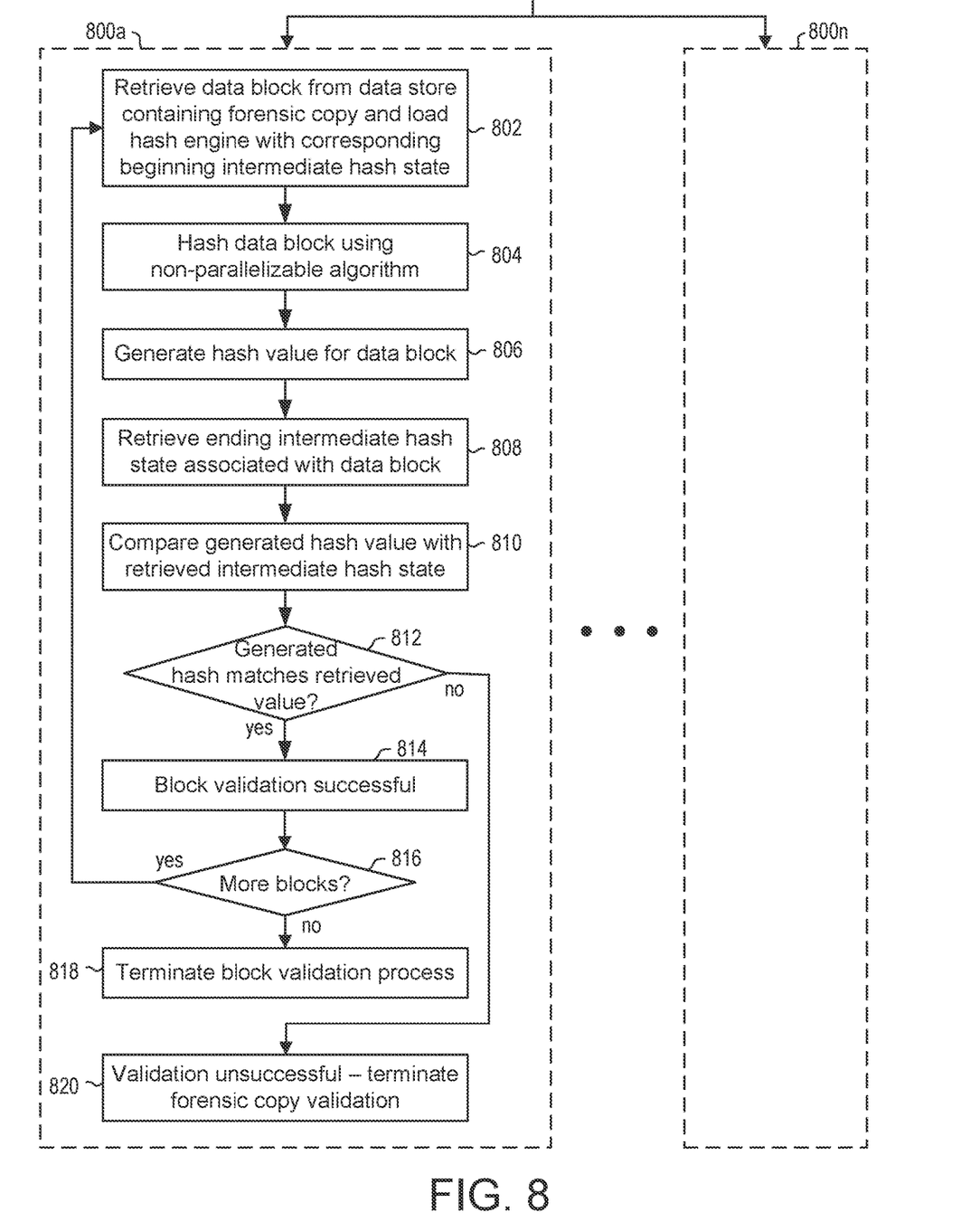
FIG. 8 is a flow diagram illustrating a parallel verification process in accordance with some disclosed embodiments is shown.

Referring to FIG. 8, a flow diagram illustrating a parallel verification process in accordance with some disclosed embodiments is shown. In this method, N different processes 800*a*-800*n* are executed on N different processors or processor cores. Each process 800 is identical in this embodiment, so only one of these processes 800 is shown in detail in the figure and will be described.

At step 802, a single one of the data blocks of the forensic copy is retrieved. The data block is identified by the locations (e.g., offsets) identified in the intermediate hash state data structure associated with the forensic copy. Additionally, the intermediate hash state corresponding to the beginning of the block (which is identified for the data block in the intermediate hash state data structure) is loaded into the hash engine. At step 804, the retrieved data block is then hashed using the initial intermediate hash state as the beginning hash state. The hashing of the data block is performed using the same non-parallelizable hashing algorithm that was used to hash the original source data. At step 806, when the hashing of the data block is complete, a hash of the data block is generated. At step 808, the ending intermediate hash state associated with the data block is retrieved from the intermediate hash state data structure.

At step 810, the generated hash is compared to the retrieved ending intermediate hash state. If at step 812 the generated hash does not match the ending intermediate hash state, the verification of the data block fails, and the entire forensic copy verification is terminated (step 820). If verification of any one of the data blocks fails, verification of the entire forensic copy fails. Consequently, there is no reason to continue the verification processes for any of the other data blocks, and those processes may be terminated as well. The other processes may be terminated immediately, or they may be terminated upon completion of the respective data block verifications.

If, at step 812, the generated hash matches the ending intermediate hash state, the verification of the data block is successful (step 814). Because the verification of the data block is complete and has not been terminated, the corresponding processor is available to verify another data block, so the process checks at step 816 to determine whether there are additional data blocks of the forensic copy to be verified. If so, the process returns to step 802, retrieves another data block and repeats the verification process for the newly retrieved data block. If there are no additional data blocks of the forensic copy to be verified, the process terminates (step 818). Alternatively, the process may determine whether any other processes are currently verifying other data blocks. If not, then the process has verified the last block and, since none of the other processes have determined that a data block has failed verification and consequently terminated the verification process, the overall verification of the forensic copy is successful, and the process is terminated.

Embodiments of the technology may be implemented on a computing system. Any suitable combination of mobile desktop, server machine, embedded or other types of hardware may be used. One exemplary embodiment may be implemented in a distributed network computing environment. The computing environment in this embodiment may include a client computer system and a server computer system connected to a network (e.g., a local area network (LAN), a wide area network (WAN) such as the Internet, mobile network, or other type of network or combination thereof). The network may represent a combination of wired and wireless networks that network computing environment may utilize for various types of network communications.

The computer systems may include, for example, a computer processor and associated memory. The computer processor may be an integrated circuit for processing instructions, such as, but not limited to a CPU. For example, the processor may comprise one or more cores or micro-cores of a processor. The memory may include volatile memory, non-volatile memory, semi-volatile memory or a combination thereof. The memory, for example, may include RAM, ROM, flash memory, a hard disk drive, a solid-state drive, an optical storage medium (e.g., CD-ROM), or other computer readable memory or combination thereof. The memory may implement a storage hierarchy that includes cache memory, primary memory or secondary memory. In some embodiments, the memory may include storage space on a data storage array. The client computer system may also include input/output ("I/O") devices, such as a keyboard, monitor, printer, electronic pointing device (e.g., mouse, trackball, stylus, etc.), or the like. The client computer system may also include a communication interface, such as a network interface card, to interface with the network.

The memory may store instructions executable by the processor. For example, the memory may include an operating system, a page editing or processing program (e.g., a web browser or other program capable of rendering pages), a server program configured to extend the functionality of the page processing program or other server code. Further, the memory may be configured with a page processable (e.g., capable of being rendered by) by the page editing program. The page may be the local representation of a page, such as a web page, retrieved from the network environment. As will be appreciated, while rendering the page, the page editing/processing program may request related resources, such as style sheets, image files, video files, audio files and other related resources as the page is being rendered and thus, code and other resources of the page may be added to the page as it is being rendered. Application server code can be executable to receive requests from client computers, generate server page files from a set of page assets (e.g., complete web pages, page fragments, scripts or other assets) and return page files in response. A page file may reference additional resources, such as style sheets, images, videos, audio, scripts or other resources at a server computer system or at other network locations, such as at additional server systems.

According to some embodiments, a network environment may be configured with a page such as a web page which is configured to launch and connect to an instance of the server program. The page may include a page file containing page code (HTML or other markup language, scripts or code), stored or generated by the server computer system, that references resources at the server computer system or other network locations, such as additional server computer systems. The page file or related resources may include scripts or other code executable to launch and connect to an instance of the server program.

Those skilled in the relevant art will appreciate that the embodiments can be implemented or practiced in a variety of computer system configurations including, without limitation, multi-processor systems, network devices, mini-computers, mainframe computers, data processors, and the like. Embodiments can be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, stored as firmware in chips, as well as distributed electronically over the Internet or over other networks (including wireless networks). Example chips may include Electrically Erasable Programmable Read-Only Memory (EEPROM) chips.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention. Steps, operations, methods, routines or portions thereof described herein be implemented using a variety of hardware, such as CPUs, application specific integrated circuits, programmable logic devices, field programmable gate arrays, optical, chemical, biological, quantum or nanoengineered systems, or other mechanisms.

Software instructions in the form of computer-readable program code may be stored, in whole or in part, temporarily or permanently, on a non-transitory computer readable medium. The computer-readable program code can be operated on by a processor to perform steps, operations, methods, routines or portions thereof described herein. A "computer-readable medium" is a medium capable of storing data in a format readable by a computer and can include any type of data storage medium that can be read by a processor. Examples of non-transitory computer-readable media can include, but are not limited to, volatile and non-volatile computer memories, such as RAM, ROM, hard drives, solid state drives, data cartridges, magnetic tapes, floppy diskettes, flash memory drives, optical data storage devices, compact-disc read-only memories. In some embodiments, computer-readable instructions or data may reside in a data array, such as a direct attach array or other array. The computer-readable instructions may be executable by a processor to implement embodiments of the technology or portions thereof.

A "processor" includes any, hardware system, hardware mechanism or hardware component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

Different programming techniques can be employed such as procedural or object oriented. Any suitable programming language can be used to implement the routines, methods or programs of embodiments of the invention described herein, including R, Python, C, C++, Java, JavaScript, HTML, or any other programming or scripting code, etc. Communications between computers implementing embodiments can be accomplished using any electronic, optical, radio frequency signals, or other suitable methods and tools of communication in compliance with known network protocols.

Any particular routine can execute on a single computer processing device or multiple computer processing devices, a single computer processor or multiple computer processors. Data may be stored in a single storage medium or distributed through multiple storage mediums.

Although the steps, operations, or computations may be presented in a specific order, this order may be changed in different embodiments. In some embodiments, some steps may be omitted. Further, in some embodiments, additional or alternative steps may be performed. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

It will be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the meaning of "in" includes "in" and "on" unless the context clearly dictates otherwise.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

Thus, while the invention has been described with respect to specific embodiments thereof, these embodiments are merely illustrative, and not restrictive of the invention. Rather, the description is intended to describe illustrative embodiments, features and functions in order to provide a person of ordinary skill in the art context to understand the invention without limiting the invention to any particularly described embodiment, feature or function, including any such embodiment feature or function described. While specific embodiments of, and examples for, the invention are described herein for illustrative purposes only, various equivalent modifications are possible within the spirit and scope of the invention, as those skilled in the relevant art will recognize and appreciate.

As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A method comprising:
   receiving an input data stream from a first data source;
   using an initial hash value, hashing the input data stream with a non-parallelizable hash algorithm;
   at one or more intermediate points in the input data stream,
      storing a corresponding offset identifying a location of the intermediate point in the input data stream, and
      storing a corresponding intermediate hash state;
   providing as outputs:
      a forensic copy of the input data stream, and
      a final hash value generated by the non-parallelizable hash algorithm; and
   verifying the forensic copy of the input data stream against the final hash value by verifying, separately and in parallel, two or more data blocks in the forensic copy of the input data stream, wherein the verifying includes:
      hashing, using an immediately preceding hash value, the forensic copy with the non-parallelizable hash algorithm to generate a corresponding verification hash value; and
      comparing the corresponding verification hash value to the intermediate hash state.

2. The method of claim 1, wherein verifying the forensic copy of the input data stream against the final hash value comprises hashing, using the initial hash value, the forensic copy of the input data stream with the non-parallelizable hash algorithm to generate a verification hash value and comparing the verification hash value to the final hash value, wherein if the verification hash value matches the final hash value the verifying is successful, and otherwise the verifying failed.

3. The method of claim 1, wherein the two or more data blocks are separated at the offsets corresponding to the intermediate points.

4. The method of claim 1, wherein verifying the two or more data blocks comprises, for each of the two or more data blocks:
   identifying a starting offset of the data block;
   identifying a hash value immediately preceding the data block; and
   identifying a hash value immediately following the data block.

5. The method of claim 1, wherein receiving the input data stream from the first data source comprises reading the input data stream from a device connected to an input port of a forensic storage and verification device.

6. The method of claim 1, wherein providing the outputs comprises storing the forensic copy of the input data stream, the final hash value and the offsets and corresponding intermediate hash states on a data storage device connected to an output port of a forensic storage and verification device.

7. The method of claim 1, wherein the forensic copy of the input data stream and the final hash value are contained in a standardized forensic data format, and the offsets and corresponding intermediate hash states are stored in a data structure having a corresponding record for each of a plurality of data blocks in the forensic copy of the input data stream, the records enabling identification of a location of each data block in the forensic copy of the input data stream and identification of starting and ending hash values associated with each data block.

8. The method of claim 1, wherein storing the offsets and corresponding intermediate hash states comprises storing the offsets and corresponding intermediate hash states in a data structure comprising a plurality of records, each record containing at least one of the offsets and a corresponding resulting intermediate hash state generated following hashing of the corresponding data block identified by the one of the offsets.

9. The method of claim 8, wherein each record in the data structure includes exactly one offset and exactly one hash value, wherein a data block corresponding to the record is identified by the offset contained in the record and a location which either: is an offset identified in a previous record; or is a starting location of the forensic copy of the input data stream.

10. The method of claim 8, wherein each record in the data structure includes a starting offset and an ending offset for a corresponding data block.

11. The method of claim 8, wherein each record in the data structure includes a starting hash value and an ending hash value for a corresponding data block.

12. The method of claim 1, wherein if the corresponding verification hash value matches the immediately following hash value, the verifying of the data block is successful, and otherwise the verifying of the data block failed.

13. The method of claim 1, wherein if verification of all of the two or more data blocks is successful, verification of the forensic copy of the input data stream is successful, and otherwise verification of the forensic copy of the input data stream failed.

14. A forensic imager comprising:
one or more processors;
one or more memories coupled to the processor;
at least one input port adapted to be connected to a target device;
at least one output port adapted to be connected to an output data storage device;
wherein the one or more processors are adapted to:
receive an input data stream from the target device;
hash the input data stream with a non-parallelizable hash algorithm;
at one or more intermediate points in the input data stream,
store a corresponding offset identifying a location of the intermediate point in the input data stream, and
store a corresponding intermediate hash state;
providing as outputs:
a forensic copy of the input data stream, and
a final hash value generated by the non-parallelizable hash algorithm; and
verify the forensic copy of the input data stream against the final hash value by verifying, separately and in parallel, two or more data blocks in the forensic copy of the input data stream, wherein the verifying includes:
hashing, using an immediately preceding hash value, the forensic copy with the non-parallelizable hash algorithm to generate a corresponding verification hash value; and
comparing the corresponding verification hash value to the intermediate hash state.

15. The forensic imager of claim 14, wherein the two or more data blocks are separated at the offsets corresponding to the intermediate points.

16. The forensic imager of claim 15, wherein verifying the two or more data blocks comprises, for each of the two or more data blocks:
identifying a starting offset of the data block,
identifying a hash value immediately preceding the data block, and
identifying a hash value immediately following the data block.

17. The forensic imager of claim 14, wherein the forensic copy of the input data stream and the final hash value are contained in a standardized forensic data format, and the offsets and corresponding intermediate hash states are stored in a data structure having a corresponding record for each of a plurality of data blocks in the forensic copy of the input data stream, the records enabling identification of a location of each data block in the forensic copy of the input data stream and identification of starting and ending hash values associated with each data block.

18. The forensic imager of claim 14, wherein storing the offsets and corresponding intermediate hash states comprises storing the offsets and corresponding intermediate hash states in a data structure comprising a plurality of records, each record containing at least one of the offsets and a corresponding resulting intermediate hash state generated following hashing of the corresponding data block identified by the one of the offsets.

19. A computer program product comprising a non-transitory computer-readable medium storing instructions executable by one or more processors to perform:
receiving an input data stream from a first data source;
using an initial hash value, hashing the input data stream with a non-parallelizable hash algorithm;
at one or more intermediate points in the input data stream,
storing a corresponding offset identifying a location of the intermediate point in the input data stream, and
storing a corresponding intermediate hash state;
providing as outputs:
a forensic copy of the input data stream,
a final hash value generated by the non-parallelizable hash algorithm; and
verifying the forensic copy of the input data stream against the final hash value by verifying, separately and in parallel, two or more data blocks in the forensic copy of the input data stream, wherein the verifying includes:
hashing, using an immediately preceding hash value, the forensic copy with the non-parallelizable hash algorithm to generate a corresponding verification hash value; and
comparing the corresponding verification hash value to the intermediate hash state.

20. The computer program product of claim 19, wherein the instructions are further executable by the one or more processors to perform:

separating the offsets corresponding to the intermediate points, the separately verifying the two or more data blocks comprising, for each of the two or more data blocks:
identifying a starting offset of the data block;
identifying a hash value immediately preceding the data block; and
identifying a hash value immediately following the data block.

* * * * *